US010556827B2

(12) United States Patent
Hoppe et al.

(10) Patent No.: US 10,556,827 B2
(45) Date of Patent: *Feb. 11, 2020

(54) METHOD FOR MODIFYING THE TRANSMISSION OF GLASSES AND GLASS CERAMICS AND GLASS OR GLASS CERAMIC ARTICLES THAT CAN BE PRODUCED ACCORDING TO THE METHOD

(71) Applicant: SCHOTT AG, Mainz (DE)

(72) Inventors: Bernd Hoppe, Ingelheim (DE); Martin Spier, Mainz (DE); Daniela Seiler, Alzey (DE); Evelin Weiss, Mainz (DE)

(73) Assignee: SCHOTT AG, Mainz (DE)

( * ) Notice: Subject to any disclaimer, the term of this patent is extended or adjusted under 35 U.S.C. 154(b) by 449 days.

This patent is subject to a terminal disclaimer.

(21) Appl. No.: 14/884,685

(22) Filed: Oct. 15, 2015

(65) Prior Publication Data

US 2016/0031755 A1 Feb. 4, 2016

Related U.S. Application Data

(63) Continuation of application No. PCT/EP2014/057535, filed on Apr. 14, 2014.

(30) Foreign Application Priority Data

Apr. 15, 2013 (DE) ........................ 10 2013 103 774
Sep. 24, 2013 (DE) ........................ 10 2013 110 565

(51) Int. Cl.
*C03C 23/00* (2006.01)
*C03C 4/08* (2006.01)
(Continued)

(52) U.S. Cl.
CPC ............ *C03C 23/0025* (2013.01); *C03C 4/02* (2013.01); *C03C 4/08* (2013.01)

(58) Field of Classification Search
None
See application file for complete search history.

(56) References Cited

U.S. PATENT DOCUMENTS 4,211,820 A 7/1980 Cantaloupe
4,769,310 A 9/1988 Gugger et al.
(Continued)

FOREIGN PATENT DOCUMENTS

CN 100383069 C 4/2008
DE 19841547 3/2000
(Continued)

OTHER PUBLICATIONS

European Search Report dated Oct. 29, 2014 corresponding to European Patent Application No. 14164628.1 with English translation, 17 pages.

(Continued)

*Primary Examiner* — Frank J Vineis
*Assistant Examiner* — Nicole T Gugliotta
(74) *Attorney, Agent, or Firm* — Ohlandt, Greeley, Ruggiero & Perle, L.L.P.

(57) ABSTRACT

A product is provided that includes a volume-colored monolithic glass or glass ceramic element and to a method for producing same. The glass or glass ceramic element has a first region in which the coloration is modified so that light transmission of the first region differs from light transmission of a second, adjacent region. The light scattering in the region of modified coloration in the glass or glass ceramic remains the same as light scattering in the second, adjacent region with non-modified light transmission.

18 Claims, 7 Drawing Sheets

20
15
3
1
16
5
23
22

(51) Int. Cl.

| | |
|---|---|
| ***C03C 4/02*** | (2006.01) |
| ***B41M 5/26*** | (2006.01) |
| ***C03C 4/00*** | (2006.01) |
| ***C03C 10/00*** | (2006.01) |

(56) References Cited

U.S. PATENT DOCUMENTS

| | | | |
|---|---|---|---|
| 6,640,039 | B1 | 10/2003 | Miura |
| 7,763,832 | B2 | 7/2010 | Striegler |
| 2002/0073735 | A1 | 6/2002 | Hayashi et al. |
| 2003/0189031 | A1 | 10/2003 | Troitski et al. |
| 2003/0230560 | A1 | 12/2003 | Troitski |
| 2004/0180773 | A1 | 9/2004 | Schreder et al. |
| 2005/0044895 | A1 | 3/2005 | Yamate et al. |
| 2006/0138103 | A1 | 6/2006 | Troitski et al. |
| 2009/0025426 | A1 | 1/2009 | Landa |
| 2010/0273631 | A1 | 10/2010 | Pelletier |
| 2011/0226231 | A1 | 9/2011 | Siebers |
| 2012/0067865 | A1 | 3/2012 | Siebers |
| 2013/0098903 | A1 | 4/2013 | Di Giovanni et al. |
| 2013/0164509 | A1 | 6/2013 | Siebers |
| 2013/0224493 | A1 | 8/2013 | Gabel |
| 2015/0239771 | A1 | 8/2015 | Siebers et al. |
| 2016/0168018 | A1 | 6/2016 | Gabel |

FOREIGN PATENT DOCUMENTS

| | | | |
|---|---|---|---|
| DE | 19939787 | A1 | 2/2001 |
| DE | 10304382 | A1 | 8/2004 |
| DE | 102008050263 | A1 | 4/2010 |
| DE | 202011102663 | | 12/2011 |
| DE | 102010027461 | | 1/2012 |
| DE | 102010032113 | | 1/2012 |
| DE | 102013216736 | | 2/2015 |
| EP | 0233146 | A1 | 8/1987 |
| JP | 2002348147 | | 12/2002 |
| JP | 2004352560 | A | 12/2004 |
| WO | 2010137000 | A2 | 12/2010 |
| WO | 2012001300 | A1 | 1/2012 |
| WO | 2012073153 | A1 | 6/2012 |

OTHER PUBLICATIONS

Li et al., "Spectroscopic Study of Optical Property and Structural State of Vanadium Ions in Lithium Aluminosilicate Glass-Ceramics", 2011, Spectroscopy Letters, 44:1, pp. 67-76.

Dejneka et al., "Chemically Strengthened Low Crystallinity Black Glass-Ceramics with High Liquidus Viscosities", 2014 International Journal of Applied Glass Science, 5 [2], pp. 146-160.

Samoilenko et al., "CW laser discoloration of X-ray irradiated silver doped silicate glasses", 2008, Elsevier, Science Direct, Optical Materials 30, pp. 1715-1722.

Veiko et al., "Generation of a bleaching wave in an ST-50-1 glass ceramics induced by a Nd:YAG laser", 2009, Quantum Electronics 39(1), pp. 59-62.

Veiko et al., "Laser modification of glass-ceramics structure and properties: a new view to traditional materials", SPIE, Bellingham, WA 2004, pp. 119-128.

Talkenberg et al., "Modifications and Color Markings in Glasses by UV Laser Radiation", Mater. Res. Soc. Symp. Proc. vol. 850 2005, pp. 143-147.

Leister et al., "Redox behaviour of iron and vanadium ions in silicate melts at temperatures up to 2000° C.", Glastech. Ber. Glass Sci. Technol. vol. 72 1999, No. 5, pp. 153-160.

English translation of International Search Report dated Oct. 21, 2014 for corresponding PCT/EP2014/057535, 3 pages.

Xionmwei et al., "Femtosecond laser-induced darkening in optical glasses", Optical Materials 20 (2002) www.elsevier.com, pp. 183-187.

English translation of International Preliminary Report on Patentability dated Oct. 15, 2015 for corresponding PCT/EP2014/057535, 9 pages.

METHOD FOR MODIFYING THE TRANSMISSION OF GLASSES AND GLASS CERAMICS AND GLASS OR GLASS CERAMIC ARTICLES THAT CAN BE PRODUCED ACCORDING TO THE METHOD

CROSS REFERENCE TO RELATED APPLICATIONS

This application is a continuation of International Application No. PCT/EP2014/057535 filed Apr. 14, 2014, which claims benefit under 35 U.S.C. § 119(a) of German Application No. 10 2013 103 774.7 filed Apr. 15, 2013 and German Application No. 10 2013 110 565.3 filed Sep. 24, 2013, the entire contents of all of which are incorporated herein by reference.

BACKGROUND OF THE INVENTION

1. Field of the Invention

The invention relates to a method for modifying absorption properties of glasses and glass ceramic materials in a localized area or full surface area over at least part of the thickness and/or volume of the starting material by a treatment with electromagnetic radiation, so that transmission of the monolithic starting material is modified in a desired extent over a part of or preferably the entire thickness. The invention further relates to glass or glass ceramic elements which can be produced by the method according to the invention.

2. Description of Related Art

For locally modifying the transmission of glass or glass ceramic components, four different possible ways have been known so far:

First, by joining two different materials with different transmission, a component can be created, which partially has a different transmission. Any joining process may be used for this purpose, such as brazing, welding and gluing. A drawback hereof is that in this case two different materials of different transmission are needed which have to be produced individually, and setting of a specific and different transmission is a challenge or is even not realizable at all in many cases. Moreover, the two different materials may have different mechanical, physical, and chemical properties. This might be disadvantageous in later use in terms of thermal shock resistance, chemical resistance, and mechanical fracture resistance. In addition, the joining seam has different physical and chemical properties and may have a detrimental effect on the properties of the component. In addition, the joining seam usually is visually disruptive or constitutes a starting edge for a fracture. Moreover, incorporation of closed surfaces into a huge component is often very difficult, since the joining has to be accomplished on all sides and gap sizes are difficult to be met, and it is impossible to apply forces on the joining seam to enhance adherence.

Second, transmission may be modified by a local coating. Such a solution is proposed in WO 2012/001300 A1, for example. Although only one material is required in this case, in contrast to a joining method, a coating material is additionally required, which has to meet specific required transmission characteristics. In order to obtain a locally higher transmission, those areas of the component which are to exhibit lower transmission are coated. A prerequisite is that the entire component must have a basic transmission that is as high as the highest transmission required in the finished product. In practice, this may lead to increased cost and complexity, since possibly the glass composition has to be changed.

Also, the cost and complexity of partial coating must not be underestimated, since masking has to be done in any way. Another drawback of the coating method is that a suitable coating has to be found, which sufficiently adheres on the component and survives any later operating conditions of the component without getting damaged.

Furthermore, the coating creates a new surface on the component, with different chemical and physical properties. This may for example be detrimental for pharmaceutical packaging, because in case of an internal coating the pharmaceutical product will come in contact with the coating. In case of an outer coating of an article, scratches or other alterations and damage may occur. In addition, a coating always builds up on the surface, which is often undesirable in terms of haptics, appearance, scratch susceptibility, or friction.

Third, a method for marking ceramic materials, glazes, glass ceramics and glasses by means of a laser is known from EP 0233146 B1. In this case, inorganic pigment particles in form of a "ceramic color body" are added as a radiation-sensitive additive to the material to be inscribed, which additive takes a different color as a result of the laser radiation. Since such pigment particles may only be added to glasses and glass ceramics during melting, they would also melt and would not have an effect any more. Such a method is only conceivable in ceramics which are sintered from powders. Also, a pulsed and focused laser beam which acts superficially is indispensable, since the ceramics are not transparent. In this process, the optimum wavelength to be selected for irradiation is that which is absorbed best by the radiation-sensitive additive, but the least possible by the inorganic material which is to be marked. Therefore, a prerequisite is a locally different absorption of the starting material, which means that local absorption points have to be included in the ceramics, which lead to a locally different absorption (and hence different color impression) of the starting material to be marked. Also, the depth of penetration of this markings is usually not greater than about 1 mm, since ceramics are usually opaque.

A fourth method is the method for laser inner marking of transparent glasses and transparent glass ceramics, in which a highly focused pulsed laser beam produces a micro-crack in a small punctiform volume (typically significantly smaller than 1 $mm^3$) within the glass and thus causes a local damage of the structure or grain. This creates a local reflection face or scattering face which deflects, reflects or scatters incident light in all directions, thus causing a frosted glass effect. The glass locally becomes translucent, which however does not necessarily lead to a change in (total) transmission. The focus of the laser beam has to be directed from point to point within the volume of the glass in order to create 2-dimensional or 3-dimensional patterns. Moreover, as a prerequisite the glass or glass ceramic has to be highly transparent prior to the treatment.

SUMMARY

The invention is based on the object to cause, in a simple way, a modification in the absorption properties in a limited area of a glass or glass ceramic over at least a portion of the thickness and/or the volume of the starting material in a manner so that in a monolithic component transmission is modified over the entire thickness of the starting material.

Neither should it be necessary to admix additional coloring particles in form of inorganic pigments to the monolithic component, nor should any additional coating or joining be required in order to obtain a localized or full-surface or full-volume modification in transmission.

Also, local scattering centers in the material which are produced by local destruction or alteration of the structure of the starting material should be dispensed with.

Moreover, the use of an expensive, pulsed and highly focused laser whose focal points have to be driven precisely through the material and which is only able to treat a very small volume, is no longer necessary with the invention.

The drawbacks of a joining seam, namely its visual appearance and the presence of one or more additional component edges which may lead to breakage should be avoided with the invention.

Furthermore, it should be possible to easily modify the transmission of closed surfaces within a larger area without having to incorporate any other material for this purpose. In particular, manufacturing of several different starting materials of different transmission is eliminated.

In addition, coatings should no longer be required for locally modifying transmission, so that research for a suitable coating material and a suitable coating method are eliminated. On the other hand, however, coatings may optionally be used to adjust the transmission and/or color or to provide other properties, such as an anti-reflective coating.

Also, addition of any particulate additives that have to be suitable for the starting material and have to be chemically compatible therewith, is eliminated. Moreover, a heterogeneous color impression of the starting material caused by the admixed pigment can be avoided in this way.

Generally, materials used for the invention include glass or glass ceramics (green glass state or already ceramized) that are colored in the visible range of wavelengths (380 nm-780 nm). Typically, such a coloration in the visible range also leads to a coloration in the infrared range.

The modification in transmission is accomplished by a localized and temporary exposure to electromagnetic radiation, such as e.g. laser radiation of a diode laser of 1 μm wavelength, which radiation results in local heating of the material.

Thus, the invention permits to solve various problems and to create products in which:

an increase in transmission of ceramized glass ceramics can be achieved to improve display capability and color reproduction and for easily adjusting different (display) colors without changing the composition and without using purer raw materials;

adjustment of a basic transmission of glasses and glass ceramics can be accomplished without changing the composition and without using other raw materials;

an increase in transmission of optical components can be achieved to improve light conductivity;

permanent markings introduced in the volume can be produced without damaging the glass matrix;

transmission can be modified without damaging the glass surface; or a modification in transmission can be caused without altering the glass volume;

a modification in the color of glasses is made possible without the need to use a second material of different color.

In order to achieve a local modification in transmission of a glass or glass ceramic, the temperature of the glass or glass ceramic is increased until an alteration of transmission occurs, and subsequently cooling is effected preferably very rapidly. The heating triggers appropriate physico-chemical reactions and/or increases electron and ion mobility in the starting material.

Accordingly, the invention provides a method for producing a glass or glass ceramic article or a glass or glass ceramic element with locally modified transmission, comprising:

providing a glass or glass ceramic article which is volume-colored by color centers or coloring ions, in particular coloring metal ions; and directing electromagnetic radiation onto a localized surface area of the glass or glass ceramic article, which radiation is absorbed in the volume of the glass or glass ceramic material; and choosing a power density of the electromagnetic radiation such that the irradiated region of the glass or glass ceramic article is heated up, and heating of the irradiated region is performed at least until an absorption coefficient and thus light transmission of the glass or glass ceramic material is modified in the volume of the heated region, at least in a spectral range; and terminating the irradiation of electromagnetic radiation after heating, and allowing the irradiated region to cool.

Typically, heating is performed until a maximum temperature is reached at which the viscosity of the glass or the glass ceramic is less than $10^{14}$ dPa·s. Preferably, heating is terminated before the softening point is reached at which the viscosity has a value of $10^{7.6}$ dPa·s, in order to avoid deformations in the treated region.

In the context of the invention, a volume-colored glass or glass ceramic refers to a material in which the color centers or coloring ions are distributed throughout the material. That is to say they are not locally concentrated in form of coloring crystallites as is the case with pigments. Like a dye, the coloring ions or color centers are dissolved in the glass or glass ceramic, while pigments are dispersed in the material. Accordingly, volume-coloring has an effect on transmission, but not on scattering, whereas pigments themselves represent scattering particles. However, it is not intended to exclude that possibly additional pigments are present.

With this method, a glass or glass ceramic article or a product comprising a volume-colored monolithic glass or glass ceramic element is obtained, which comprises a first region in which the coloration differs from that of a second, adjacent region, so that the absorption coefficient of the first region and thus light transmission through the first region is different from the absorption coefficient and thus light transmission of a second, adjacent region, while light scattering in the glass or glass ceramic of the first region differs from light scattering in the glass or glass ceramic of the second region by not more than 20 percentage points, preferably by not more than 10 percentage points, more preferably by not more than 5 percentage points, and most preferably by not more than 1 percentage point. Thus, light scattering in the glass ceramic of the first region is substantially the same as light scattering in the second, adjacent region with non-modified light transmission. The upper limit of light scattering differing by not more than 20 percentage points also applies to the case that light scattering in the first region is lower than in the second region. Given this marginal increase in light scattering, if any, there will be no visible effect. Light scattering is the fraction of total incident intensity minus the directly transmitted light, Fresnel reflection, and absorption. The difference in scattering given in percentage points refers to the proportion of scattered light during transmission of a light beam. If, for example, the proportion of scattered light intensity in the second region is 3% of the total intensity, an increase by 5 percentage points in the first region then means a proportion of scattered light intensity in the first region of 3%+5%=8%. In other words, the increase in scattering given as a percentage in absolute terms specifies an increase in percentage points. The terms transmission, scattering, absorption, and remission as used in the context of the invention are in conformity to the definitions according to DIN 5036-1 and can be determined with the measurement rules according to ISO 15368.

If only the surface of the material would be treated by the method according to the invention, the effect of modification of absorption and therefore modification of transmission would often be very small and usually inadequate when considering the whole volume. Therefore, the method of the invention permits, by selecting a wavelength of the radiation which is absorbed in the volume of the material, to not only heat and modify the surface, but simultaneously at least a certain region of the volume of the glass, in order to make the effect strong enough so that it will correspond to the extent desired for the application and to avoid overheating of the surface of the material during treatment.

As mentioned before, a laser is preferably used for locally heating the glass or glass ceramic material. By using a laser beam, the radiation energy can be introduced into the material in strictly localized manner.

Another important feature of the invention is the fact that the incident wavelength need not be the wavelength at which the effect is achieved, i.e. the wavelength at which the modification of transmission occurs. Thus, it is possible according to the present invention to irradiate in the infrared wavelength range at a wavelength of 1 μm, for example, because the glass or glass ceramic has an absorption band in this wavelength range. However, the resulting effect may occur in the visible range between 380 nm and 780 nm, for example, and a modification of transmission may be caused at one or more wavelengths within this range due to physico-chemical reactions of the elements and compounds included in the glass. This is due to the fact that although the irradiated energy only interacts with specific elements of the glass or the glass ceramic it has an effect on the overall structure of the glass or glass ceramic.

It should moreover be possible to treat plastics accordingly, so that the method is not limited to only glasses, glass ceramics, ceramics, and optoceramics. Thus, in order to achieve a local modification of transmission, an increase in temperature is also caused locally in the volume. This is effected by electromagnetic radiation in a wavelength range in which the glass or glass ceramic exhibits partial transmittance for the incident electromagnetic radiation. In this way, energy is not only introduced superficially but throughout the entire thickness of the glass or glass ceramic element or in a partial volume thereof. When the product of radiation density and absorption is sufficiently high, a (local) shock-like increase in temperature will occur, and thus a modification in transmission. If this product is too large, only the surface will be heated and therefore overheated and the effect in the volume will not be strong enough without damaging the material. If the product is too small, heating will occur too slowly, and either the effect will not occur at all or it will not be locally limited, i.e. it will be smeared.

Therefore, according to one embodiment of the invention, the radiation density or power density of the electromagnetic radiation and/or the absorption coefficient $\alpha$ of the glass or glass ceramic material is selected such that the product P of power density and absorption coefficient $\alpha$ is at least P=0.25 $(W/mm^3)\cdot(l/mm)$. To avoid heating to occur only superficially, according to yet another embodiment of the invention, the absorption coefficient should be not more than 2/d, wherein d is the thickness of the glass or glass ceramic element.

The effect of a modification in absorption behavior and thereby a modification in transmission is probably a result of redox reactions of coloring elements in the material, or of a dissolution of previously introduced color centers (e.g. by solarization effects or other extremely short-wave radiation energy). By choosing the radiation source and the manner of introducing the energy, the modification of transmission may range from a dot-shaped over a linear to a 2-dimensional extent. Dot-shaped herein only refers to the geometric projection of the laser beam on the surface, but not to focusing in form of a spatial point. Across the thickness of the material the shape may therefore represent a cylinder or a cone with an acute angle. When introducing energy in dot-shaped manner, the region of modified transmission may therefore take any form, for example that of letters, characters, or that of triangles, squares, or any other geometric shape, by moving the radiation source or by moving the component. The dimensions of the regions of modified transmission may range from a diameter of 0.1 mm up to an area of several square meters. The magnitude of modification in transmission may range from an increase by 0.1 percentage points to an increase by 50 percentage points in addition to the initial transmission. Preferably, in particular in dark colored glass ceramics or glasses, transmission in the visible spectral range of the first region is increased by at least a factor of 2 as compared to the second, adjacent region.

As already mentioned above, rapid cooling is preferred. This is favorable to rapidly reduce ion mobility after the heating and so to freeze the effect of color change or to prevent redox reactions that took place during heating from reversing. Therefore, according to one embodiment of the invention it is contemplated that the glass or glass ceramic is cooled after heating with a cooling rate of at least 1 K per second, preferably at least 5 K per second, more preferably at least 10 K per second, at least within a temperature range between the maximum temperature and 100 K below the maximum temperature.

According to one embodiment of the invention, the heating of the glass or glass ceramic by the electromagnetic radiation is performed in such a manner that the surface of the glass or glass ceramic article remains cooler than volume regions below the surface. Thus, the volume will reach the required process temperature earlier than the surfaces. The process may be terminated before the surfaces start to soften/yield. In this way, the surfaces remain rigid and no permanent plastic deformation will arise, and no tensile stress, or of a lower magnitude.

One way to achieve this is to cool the surface of the glass or glass ceramic article already while being heated by the electromagnetic radiation. In particular this means a cooling which causes a greater heat transfer than would otherwise exist by heat losses due to heat radiation and heat conduction. Cooling may in particular be accomplished by placing the surface in communication with a heat removing fluid or a cooling fluid. Particularly preferred in this case is a fluid stream that flows over the surface. Cooling may be effected on one side of the glass or glass ceramic article or on both sides. Suitable for this purpose is water or a water-ethanol mixture. Such a mixture absorbs less infrared radiation than water.

With such a cooling during heating, surface distortions or a volume expansion may possibly be avoided or at least reduced. According to yet another embodiment of the invention, compressive stress regions may be produced near the surface, or a creation of elevated tensile stresses is prevented, since expansion at the surface is reduced or avoided.

According to yet another embodiment of the invention, a thermal post treatment step may be performed after cooling. With such a post treatment step, tensile stresses induced by the previous heating may be relieved. Also, fine-tuning of the produced transmission is possible by a step of thermal post treatment.

Possible variations of thermal post treatment include:

A second heating step using electromagnetic radiation, preferably using a laser, whereby the volume is heated up to and hold at a stress relieving temperature.

A second heating step using electromagnetic radiation, preferably using a laser, which only heats up the surface(s) to relieve stress there. This may be beneficial because near-surface stresses are much more critical than stresses in the volume. To achieve such a rather superficial heating, electromagnetic radiation of wavelengths different from those of the electromagnetic radiation of the first heating step may be used for the second heating step.

Thermal reheating and stress relieve in a conventional furnace, for example in a lehr.

Radiation sources that may be used include UV radiation sources, IR radiators with tungsten filaments, laser sources, such as diode lasers, fiber lasers, and other radiation sources. The choice of the appropriate radiation source is determined by the absorption capacity of the glass to be treated in the range of wavelengths of the radiation source. For ceramized CERAN glass ceramics, for example, diode lasers of a wavelength in a range of about 1 μm are suitable. At this wavelength, a CERAN plate of 4 mm thickness has a transmittance between 50% and 80%, so that sufficient radiation will pass through the entire thickness of the plate in order to heat it homogeneously throughout the thickness of the plate at the location of energy input. With sufficient power, therefore, a temperature of more than 700° C. may be obtained within a few seconds at the location of energy input.

Generally it is preferred to heat the glass or glass ceramic with a rate of temperature change of at least 250 K per minute. The rapid heating ensures that the regions of modified coloration can be sharply defined or will have sharp contours. Moreover, undesired nucleation, or in case of glasses crystallization, is suppressed.

If it is assumed that the effect of modification of the absorption coefficient or the color change is solely a result of the temperature increase in the glass or glass ceramic material, other types of energy input apart from radiation heating would in principle also be possible in order to achieve a color change, for example local heating using a gas burner. However, the rapid heating according to the invention using an electromagnetic radiation that penetrates into the material is preferred in order to achieve rapid heating of the volume below the irradiated surface. This allows to achieve sharp contours of the regions of modified coloration. In case of a merely superficial irradiation, the heat would spread laterally along the surface substantially just as quickly as in the direction away from the surface into the volume. Therefore, if a color change of the volume below the surface or in particular even of the entire region between two faces of a glass or glass ceramic plate is produced only with superficial heating, blurred edges of the color-modified region will be resulting accordingly.

Once the plate has been cooled to room temperature, transmission at the location of energy input will be higher than before the radiation treatment. The area of energy input may be determined both by the shape of irradiated energy, and by additionally masking the plate to be treated such that portions of the glass that are not intended to be modified are effectively protected from impingement of radiation.

An advantage of this method over the prior art is the fact that a monolithic component can be used and that adaptations of the composition, joining or coatings are not required. The method can be carried out very rapidly (within seconds), is highly flexible and extremely well adaptable to a wide range of geometries and applications. And even three-dimensionally shaped parts can be treated.

The method of the invention is very suitable for locally attenuating the coloration of a glass ceramic article that is volume-colored by vanadium oxide. Accordingly in this case, by the heating, light transmission in the visible spectral range between 380 nanometers and 780 nanometers is raised in the local first region, i.e. the absorption coefficient is lowered. In this way, windows of higher transmission may easily be produced in an otherwise dark appearing glass ceramic cooktop, for example. Below such a window, a display may then be mounted, and the light from the display will be clearly visible for the viewer. A window, as a particularly preferred form of a region modified in color as produced by the method according to the invention refers to a region which is surrounded along at least three edges thereof or at least along 50% of its periphery by adjacent non-brightened second regions. Preferably, the first region is completely surrounded by second regions or glass ceramic material non-modified in color.

Furthermore, it will generally be reasonable not to modify the coloration of a major part of the surface of the glass or glass ceramic article, e.g. to brighten it, because in this case it would be easier to provide an article in an appropriate different color and then to modify the coloration thereof in a localized area. According to one embodiment of the invention it is therefore contemplated that the proportion of the total surface area of the one or more first regions on a face of the glass or glass ceramic article occupies not more than one third of the surface area of this face. If there are more than one brightened area, the invention preferably contemplates in accordance with this embodiment that the total surface area of all of these areas occupies not more than one third of the surface area of a face of the glass or glass ceramic article.

Thus, according to one embodiment of the invention, a product is produced which comprises a glass or glass ceramic element volume-colored with vanadium oxide, in which integral light transmission in the visible spectral range is increased in the first region compared to a second, adjacent region that has not been treated according to the invention. Here, integral light transmission refers to light transmittance averaged over a range of wavelengths, for example the visible spectral range from 380 to 780 nanometers wavelength. Transmittance is light transmission as a function of wavelength expressed as a percentage value. In the context of the present description, the term light transmission refers to integral light transmission, unless transmittance is mentioned.

The invention, or glass or glass ceramic articles according to the invention may be of particular interest in the fields of fiber optics, pharmaceutical packaging, household appliances, optics, flat glass, inter alia, for applications such as:

improving the suitability of highly colored products (such as volume-colored glass ceramic cooktops) for visual displays of a type of displays that are installed below the product, by locally increasing transmission;

producing a 1-dimensional (bar) or 2-dimensional (dot matrix) barcode in a glass wall (e.g. of a vial/syringe) for permanent labeling;

producing a fill quantity scale or fill level line or other mark in the glass wall of a container (e.g. a vial, a tube, or a syringe);

producing visual design elements in flat glasses (e.g. architectural glazing), such as company logos or geometric objects (arrows as a direction sign, escape route);

permanent forgery-proof marking of products by a logo in the volume of the glass;

producing pictograms, letters, geometric objects in touch applications for mobile phone covers or other electronic devices;

locally modifying the direction and conduction of light for optical purposes such as beam guidance in optical systems, light trap limits for absorbing scattered radiation;

improving the basic transmission of optical glasses for reducing scattering and increasing total transmission of lenses and optical systems;

producing sharply defined "light gaps" or light windows in lighting applications (e.g. for dashboard lighting in automobiles, or the like).

BRIEF DESCRIPTION OF THE DRAWINGS

The invention will now be described in more detail by way of exemplary embodiments and with reference to the accompanying figures. In the figures, the same reference numerals designate the same or equivalent elements.

In the drawings.

DETAILED DESCRIPTION

Figure 1:
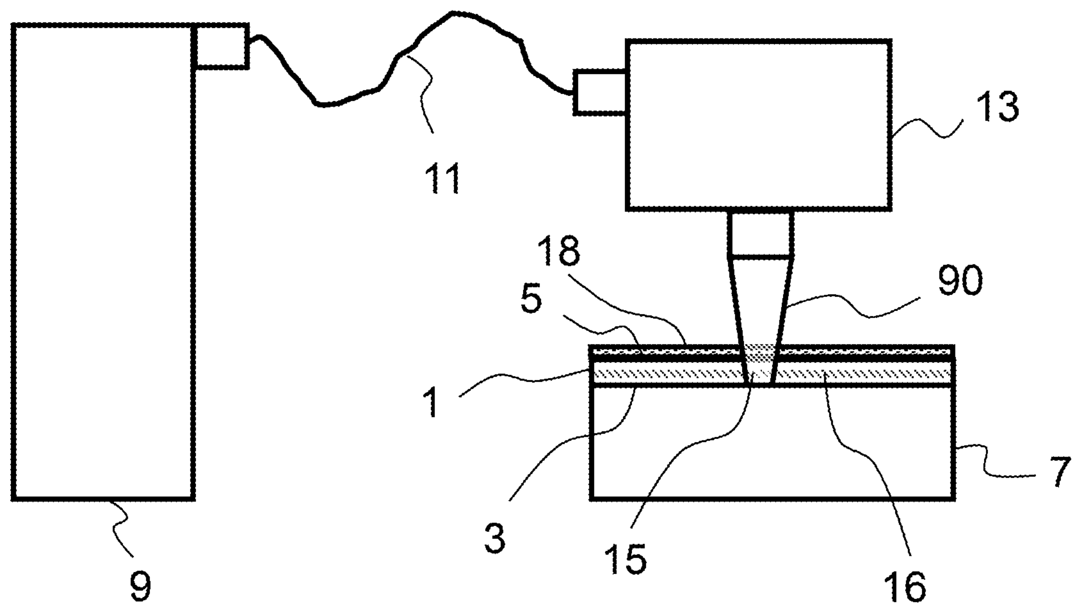
FIG. 1 and FIG. 2 show apparatus for performing the method of the invention.

The method of the invention for producing a glass or glass ceramic article with locally modified transmission will now be described in more detail with reference to FIG. 1. A ceramized glass ceramic plate 1 is provided, which has a first face 3 and a second face 5 and dimensions of 50 mm×50 mm and a thickness of 4 mm. Glass ceramic plate 1 may have a knob pattern on one face, as usual. In particular, the glass ceramic plate is volume-colored by coloring metal ions. Such metal ions may for example be manganese ions, iron ions, rare earth ions such as in particular cerium ions, chromium, nickel, cobalt or vanadium ions. The coloring effect of these ions may depend on an interaction with other components of the glass or glass ceramic. That means, the coloration may be enhanced by interaction with other metal ions, or vice versa, may be attenuated. For example, manganese and iron ions exhibit interaction with tin and/or titanium, which is why preferably manganese or iron oxide is employed as a coloring agent preferably in combination with tin oxide and/or titanium oxide in the composition. Coloring ions of rare earth elements, in particular cerium ions, interact with ions of chromium, nickel and cobalt. Preferably, therefore, oxides of rare earth elements are employed as a coloring agent in combination with oxides of the above mentioned metals in the glass or glass ceramic composition. For vanadium, an interaction with tin, antimony, or titanium can be assumed.

Generally, without being limited to the specific exemplary embodiments, the glass or glass ceramic therefore includes ions of at least one of the following metals or combinations of ions of the following metals:

vanadium, in particular in combination with tin and/or titanium;

rare earth elements, in particular cerium, in combination with chromium and/or nickel and/or cobalt;

manganese in combination with tin and/or titanium;

iron in combination with tin and/or titanium.

Vanadium oxide is a very strong coloring agent. Generally in this case, coloration is only accomplished during ceramizing. It has been found that with the invention a volume-coloration caused by vanadium oxide may be offset, at least partially. To obtain a clearly visible effect in case of a glass ceramic colored by vanadium oxide, it is therefore contemplated according to one embodiment of the invention, without limitation to the exemplary embodiment, that the glass ceramic includes at least 0.005 percent by weight, preferably at least 0.01 percent by weight, more preferably at least 0.03 percent by weight of vanadium oxide. This causes a sufficiently strong coloration and accordingly a significant modification of transmission in locally brightened region 15.

Glass ceramic plate 1 is placed on a slip-cast silicon oxide ceramic support 7 of 100 mm×100 mm and of a thickness of 30 mm. The first face 3 bearing upon the silicon oxide ceramic support 7 is for example the smooth upper surface of glass ceramic plate 1. The upwardly facing second face 5 is the knobbed bottom face in this case.

Generally, like in this example, it may be beneficial to irradiate the electromagnetic radiation to that surface which later faces away from the user. In a glass ceramic cooktop, one face of the glass ceramic plate typically has a knob pattern thereon and defines the surface facing away from the user. Irradiation is suitably effected on the surface facing away from the user because the surface that faces the radiation source tends to become warmer, which may lead to surface alterations. Such alterations will be less disturbing on the surface that faces away from the user.

Silicon oxide ceramic support 7 and glass ceramic plate 1 are at room temperature. Above this arrangement, a laser scanner 13 with a focusing optical system with a focal length of 250 mm is installed in a manner so that laser beam 90 is incident perpendicular to the surface of glass ceramic plate 1. In the focus, laser beam 90 has a diameter of 1.5 mm. The arrangement of silicon oxide ceramic support 7 and glass ceramic plate 1 is placed at such a distance that the glass ceramic plate 1 is not in the focus of laser beam 90, so that the laser beam is defocused. In the exemplary embodiment, laser beam 90 has a diameter of 10 mm on glass ceramic plate 1. Laser radiation of a wavelength between 900 nm and 1100 nm is supplied from a laser 9 to laser scanner 13 via a transfer fiber 11. In this example, a diode laser is used as the laser 9, e.g. from company Laserline, which provides an adjustable output power between 0 W and 3000 W. Once the laser 9 has been enabled, glass ceramic plate 1 is locally irradiated with an output power of 1000 W and for a duration of 10 seconds. The glass ceramic is thereby heated at a rate of more than 250 K per minute, and within the period of irradiation the temperature exceeds a value at which an increase in integral light transmission of the glass ceramic material occurs. Typically, at this temperature the glass ceramic has a viscosity of less than $10^{14}$ dPa·s. Then, the laser is turned off and the glass ceramic plate cools down in air. The cooling rate achieved in this way is more than 1 K per second, usually even more than 5 K per second, or more than 10 K per second, at least within a temperature range between the maximum temperature and 100 K below the maximum temperature, preferably down to the temperature at which the viscosity of the glass ceramic has a value of $10^{14}$ dPa·s. In this manner, the color change, especially the brightening effect in this case, is frozen. In local region 15 which was heated by laser beam 90, transmission has locally become significantly higher across the entire thickness of the plate, which means that visible radiation can better pass through the glass ceramic plate 1. Adjacent regions 16 of the plate, or the rest of glass ceramic plate 1, remain dark, i.e. keep their low transmission in the visible range. Also, glass ceramic plate 1 is geometrically unchanged, in particular even in irradiated region 15. This applies to both, flatness and local thickness variations.

According to another embodiment, the laser beam may be scanned over the surface of the glass or glass ceramic article by means of a laser scanner, so that a region 15 is heated, which has a larger surface area than the light spot of the laser beam on the surface of the glass or glass ceramic article.

In a modification of the invention, the glass or glass ceramic article is optionally cooled superficially during irradiation, i.e. when being heated up. For this purpose, a cooling fluid 18 is brought into contact with the surface of the glass or glass ceramic article. Cooling fluid 18 may flow over the surface of the glass or glass ceramic article to enhance the cooling effect. Specifically, in the exemplary embodiment shown in FIG. 1, a film of cooling fluid is provided on the irradiated second face 5 of glass ceramic plate 1. The cooling fluid film could easily be caused to flow along the surface or along second face 5 by having the face 5 arranged obliquely, for example, and/or by continuously feeding cooling fluid 18. Otherwise than shown in FIG. 1, an arrangement may be provided in which both faces 3, 5 are in contact with a cooling fluid 18, preferably a flowing cooling fluid 18. Suitable for this purpose is an ethanol-water mixture. Generally, without being limited to the illustrated exemplary embodiment, it is preferred in this case that the ethanol content of the mixture does not exceed 50 percent by volume. Such a mixture is advantageous, because it absorbs less infrared radiation than pure water. The cooling fluid helps to avoid or at least reduce alterations of the surface such as warping or bulging. Additionally, the properties of the glass or glass ceramic article 1 may be positively influenced by the simultaneous cooling during irradiation. According to yet another embodiment of the invention, compressive stress may be produced at the surface. At least it is possible to prevent or reduce high tensile stresses at the surface after irradiation and cooling. Generally, therefore, a glass or glass ceramic article may be produced, in which in the first region 15 treated according to the invention stress at the surface is lower than in the center of the volume of the first region 15. Here, the term lower stress is not to be understood as an absolute value, but with sign. For example, the surface may almost be free of stress, while in the center of the volume there is a tensile stress which is a stress with positive sign. Even in this case, the stress is lower at the surface, since the interior stress is positive.

Figure 2:
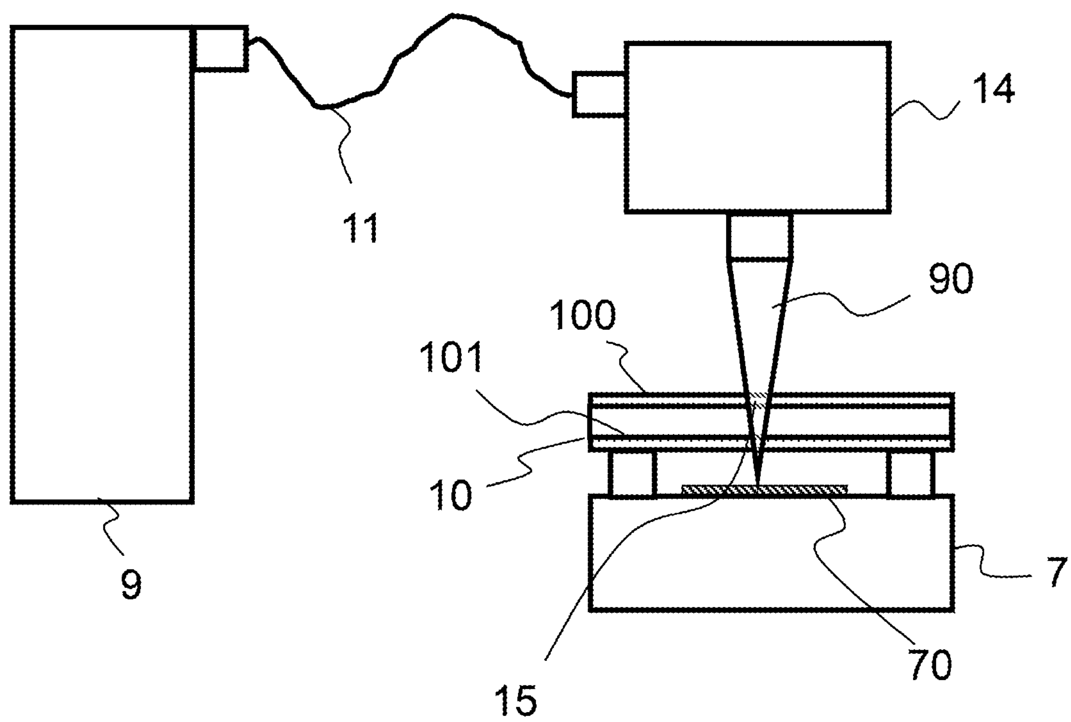

Referring to FIG. 2, another exemplary embodiment will be explained, in which a coloration induced by solarization is modified, in particular at least partially offset, so that locally the product exhibits higher transmission in the visible spectral range. In this example, a glass tube 10 made of clear borosilicate glass (Fiolax glass), with a diameter of 15 mm and a length of 60 mm, which has been solarized by short-wave radiation is arranged horizontally at a distance of 10 mm above a silicon oxide ceramic support 7 sized 200 mm×200 mm and having a thickness of 30 mm. Due to the solarization, the glass tube 10 is colored brown throughout its volume. At the beginning of the treatment, glass tube 10 is at room temperature.

Above this assembly, a laser line generating optical system 14 is installed, which produces a line of 3 mm width and 56 mm length from a round laser beam, so that the laser beam 90 in the form of a laser line impinges onto the outer circumferential surface 100 of glass tube 10 perpendicularly to the longitudinal axis thereof. Via a fiber 11, laser line generating optical system 14 is supplied with laser radiation of a wavelength between 900 nm and 1100 nm. The laser source here, again, is a diode laser, such as available from Laserline company, which provides an adjustable power output between 0 W and 3000 W. Once the laser 9 has been enabled, glass tube 10 is locally irradiated with a power of 1000 W and a duration of 10 s. Then, laser 9 is switched off and glass tube 10 is allowed to freely cool in air. In the irradiated region, a clear transparent colorless ring has been produced along the circumference of glass tube 10. The rest of the glass tube 10 remains dark in color, i.e. it retains its low transmission in the visible range of wavelengths. Moreover, the glass tube is geometrically completely unchanged, even in the region 15 of irradiation. This applies both to roundness and to local evenness deviations.

Thus, without being limited to the exemplary embodiment described above, the method permits to produce a product from or with a solarized and thus volume-colored monolithic glass element in which the solarization causes volume-coloration due to light absorption in the visible spectral range, and in which integral light transmission in the first region is increased compared to the second region.

The two exemplary embodiments moreover have in common that the first region 15 with a transmission differing from an adjacent region, in particular with a higher transmission in the first region, extends from a first surface to a second, opposite surface of the glass or glass ceramic element. This is achieved by the electromagnetic radiation which penetrates through the article thus heating the entire glass or glass ceramic material between the two opposite surfaces. In the first exemplary embodiment, the first region extends from the first face 3 as the first surface to the second face 5 as the second surface. In the second exemplary embodiment, the opposite surfaces are defined by the outer circumferential surface 100 and the inner surface 101 of glass tube 10. However, it is also possible to achieve an increase in transmission to improve visibility of displays even when not the entire volume between the two surfaces is brightened, but only a layer, for example of a layer thickness that corresponds to half the thickness of the glass ceramic plate. Generally, of course, it is possible with the method of the invention to produce a plurality of regions 15 in the glass or glass ceramic element.

According to one embodiment of the invention it is generally favorable for the method, without being limited to the particular exemplary embodiments of FIGS. 1 and 2, when a means is provided which reflects the electromagnetic radiation transmitted through the glass or glass ceramic article back into the glass or glass ceramic article. In particular, for this purpose, the glass or glass ceramic article may be placed on a support which reflects electromagnetic radiation back into the glass or glass ceramic material.

By such reflection, the efficiency and speed of heating may be increased and so the process duration may be shortened. If an infrared laser is used, like in the example of FIG. 1, a support may be used which specifically reflects in the range of wavelengths of the laser radiation from 0.9 μm to 1.1 μm.

If, as in the example shown in FIG. 1, a slip-cast silicon oxide ceramic support is used, an appropriately fine-grained silicon oxide ceramic can be used for this purpose. Generally, without limitation to silicon oxide ceramics, it is preferred according to a further embodiment of the invention that the average grain size of a ceramic, preferably of the slip-cast $SiO_2$ ceramic that is used as a support for the glass or glass ceramic article, is smaller than the wavelength of the electromagnetic radiation. In this manner strong scattering of the radiation at the surface of the support is avoided. In case of broadband radiation sources, the average grain size of the ceramic should be less than the wavelength of the maximum spectral power density of the radiation transmitted through the glass or glass ceramic material, or, alternatively, the center wavelength of the spectrum of the radiation transmitted through the glass or glass ceramic material.

According to another embodiment of the invention, instead of a ceramic surface such as that of the silicon oxide ceramic support 7 according to FIG. 1 and FIG. 2, a metallic reflecting support can be used. Suitable are aluminum or polished copper, for example. It is of course also possible to combine this embodiment with a ceramic support, by placing a metallic reflective layer or plate on the ceramic support. As an example, FIG. 2 shows a metallic plate 70 arranged on the silicon oxide ceramic support 7, which plate reflects the transmitted laser light having a wavelength preferably in the range from 0.9 μm to 1.1 μm.

The heating and resulting color change of region 15 and subsequent cooling may optionally be followed by a thermal post treatment step to relieve tensile stresses. A thermal post treatment at a temperature of 800° C. and a holding time of 5 minutes already leads to a significant reduction of tensile stresses in a glass ceramic plate 1. The heating to a relaxation temperature in the thermal post treatment step may be accomplished using a laser, any other electromagnetic radiation source, or in a suitable furnace. When heating is effected using electromagnetic radiation, a radiation source may be used whose radiation is more strongly absorbed than the electromagnetic radiation used for heating in the first color modifying step. So in particular the surface of the glass or glass ceramic will be heated. Tensile stresses existing at the surface are particularly relevant with regard to the strength of the glass or glass ceramic element.

In the example shown in FIG. 1, an optional cooling fluid is provided to prevent excessive heating of the surface. Another measure to produce a temperature gradient such that during irradiation the surface remains cooler than regions of the glass or glass ceramic below the surface would be an appropriate initial temperature profile of the glass or glass ceramic element to be treated. For example, initial starting temperature profiles with a suitable gradient across the thickness of the glass or glass ceramic may be created by freezing and/or pre-heating. For an appropriate starting profile, the volume may in particular be made hotter than the surface already prior to the actual exposure to the electromagnetic radiation. To give an example, the glass or glass ceramic article may be pre-heated with quenching of the surfaces prior to being exposed to the electromagnetic radiation.

According to yet another embodiment of the invention, otherwise than shown in FIGS. 1 and 2, the laser beam 90 may be focused in the volume of the glass or glass ceramic. In this way, compressive stresses may possibly arise at the surfaces of the processed material.

Generally, the glass or glass ceramic material may additionally be toughened prior to or after the color change. This may be accomplished by thermal or chemical tempering for selectively introducing near-surface zones of compressive stress, so that the material resists to or compensates for tensile stresses possibly induced by the process.

Figure 3:
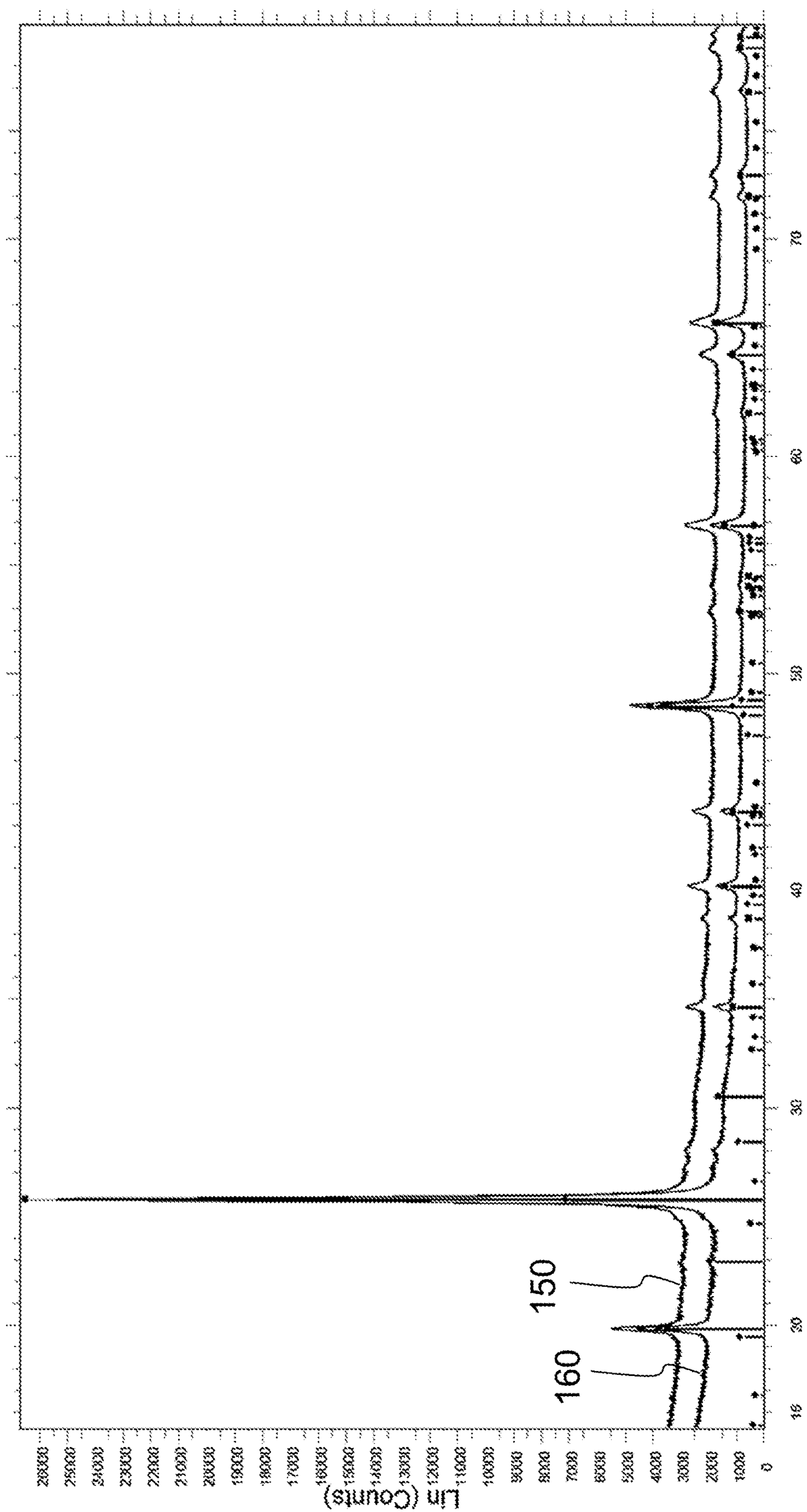
FIG. 3 shows X-ray diffraction spectra of a brightened region and a non-modified region of a volume-colored glass ceramic.

FIG. 3 shows X-ray diffraction spectra of a monolithic glass ceramic element as obtained by the method explained with reference to FIG. 1. The tested glass ceramic is a lithium aluminosilicate glass ceramic volume-colored by vanadium oxide, as is used for cooking plates, for example. X-ray diffraction was used to compare the crystal phases, the content of crystal phases, and the crystallite size of a region 15 brightened by laser irradiation with those of adjacent, non-brightened regions 16.

Additionally, the relative intensities of different crystal phases are marked with a diamond, a square, or a circle. Squares indicate X-ray diffraction peaks of high-quartz mixed crystal (HQMK), diamonds indicate X-ray diffraction peaks of lithium aluminosilicate or keatite mixed crystal (KMK, $LiAlSi_3O_8$), and circles indicate X-ray diffraction peaks of zirconium titanate ($ZrTiO_4$) which was also detected in the glass ceramic. Curve 150 represents the X-ray diffraction spectrum of the brightened region, i.e. region 15 treated according to the invention, and curve 160 represents the X-ray diffraction spectrum of an adjacent, non-modified region 16. As can be seen, the curves are virtually identical, except for the different offset for purposes of illustration. The only result of a closer analysis of the intensities of the X-ray diffraction peaks is a very small increase in the content of the keatite mixed crystal phase. The results are summarized in the table below:

| Sample | Crystallite size [nm] [+/−5%] HQMK | KMK | HQMK phase content [+/−10%] uncorrected | corrected | KMK phase content [+/−10%] uncorrected | corrected |
|---|---|---|---|---|---|---|
| brightened region | 49 | not determinable | 54 | 66 | 3 | 3 |
| non-modified region | 48 | not determinable | 55 | 67 | 1 | 1 |

For absorption correction in the columns designated "corrected", the chemical composition of the glass ceramic and an assumed density of □=2.5 g/cm$^3$ were used.

According to the table above and to FIG. 3, the content of the high-quartz mixed crystal phase does not change within the measurement error. Only the content of keatite mixed crystal shows a change which does not have any significant impact on the microstructure of the glass ceramic because of the low proportion of this crystal phase. That means, even if treated and non-treated regions of a glass ceramic element do not exhibit any significant structural differences, according to one embodiment a region of an aluminosilicate glass ceramic treated according to the invention, in particular of a lithium aluminosilicate glass ceramic, may be distinguished by an increased content of keatite mixed crystal.

Changes in the crystal phases and/or their proportions may have an influence on light scattering. When light scattering in the material changes, this also leads to a change in remission when illuminating the treated region. As demonstrated in the above example, treated and non-treated regions are virtually identical in their morphology, in particular with respect to the existing crystal phases. Therefore, in an inventive product remission does not change either, or only marginally, when comparing a treated and a non-treated region. Therefore, according to a further embodiment, without limitation to the exemplary embodiment described above, remission for visible light in the first region differs from remission of the second region by not more than 20 percentage points, preferably by not more than 10 percentage points, more preferably by not more than 5 percentage points.

Figure 4:
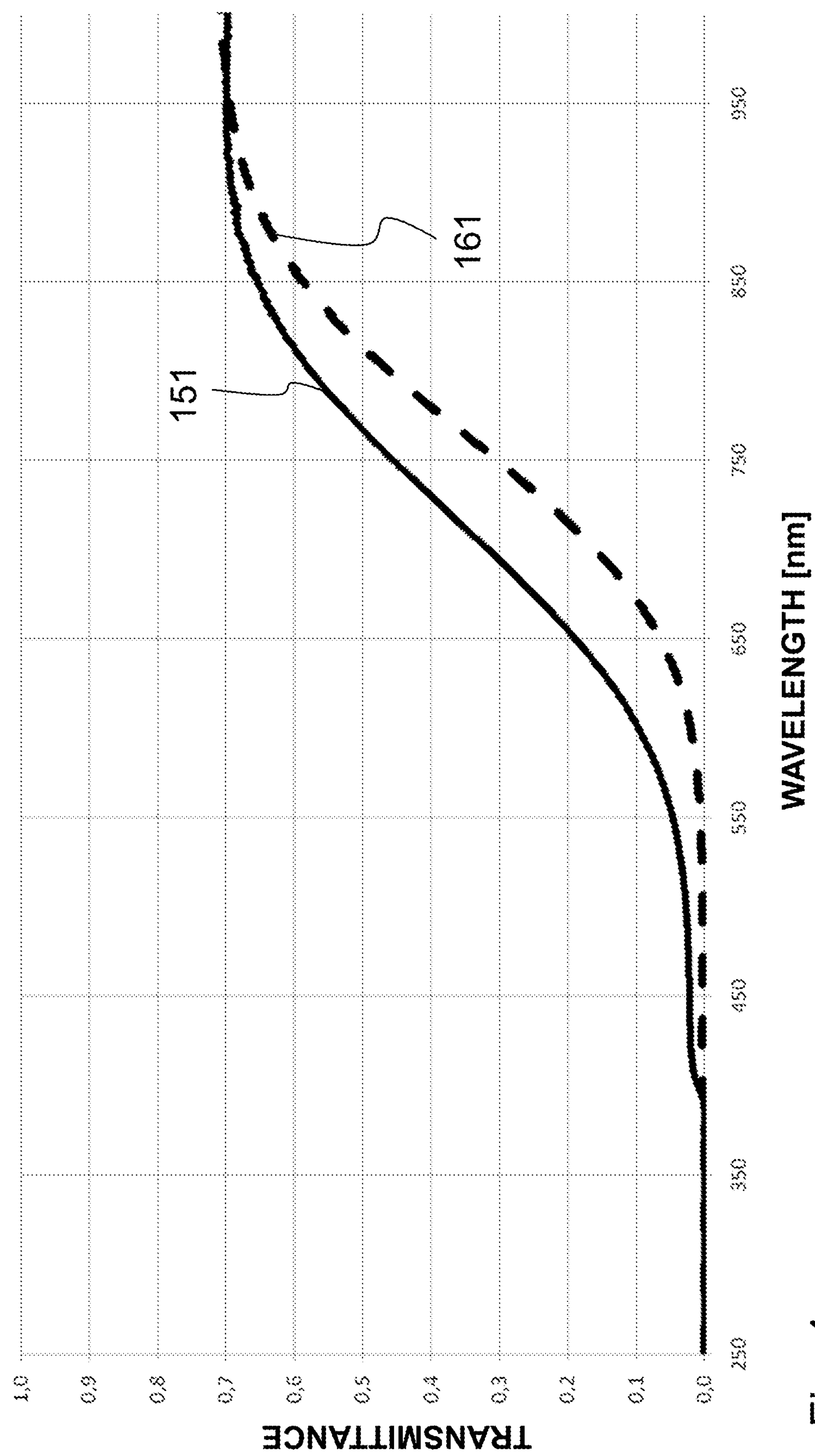
FIG. 4 is a graph of spectral transmittance of a treated region and a non-treated region of a glass ceramic plate.

FIG. 4 shows transmittances of a glass ceramic plate volume-colored by vanadium oxide and treated according to the invention, as a function of wavelength. Curve 151 in FIG. 4 represents spectral transmittance of a region 15 treated according to the invention, curve 161 represents spectral transmittance of an adjacent, non-treated region 16. From the two curves it can be seen that in the treated region 15 transmittance is significantly increased over the entire spectral range between 420 nanometers and 780 nanometers. This is advantageous when it is desired to improve transparency without significantly modifying the tint, in order to selectively make specific regions of the glass or glass ceramic article more transparent for luminous or non-luminous display elements, or, more generally, to provide viewing windows. Therefore, according to one embodiment of the invention and without limitation to the specific exemplary embodiment, spectral transmittance of the first region is higher than that of an adjacent, second region within the entire spectral range between 420 nanometers and 780 nanometers.

What is also remarkable about the spectral transmittance of FIG. 4 is that transmittance in the blue and green spectral range increases more strongly than that in the red range. For example, at 500 nanometers transmittance increases from 0.0028 to 0.027, i.e. by a factor of more than nine. At 600 nanometers, the factor is lower, namely 4.7 in this case. It is just this what is particularly favorable to improve display capability for blue and/or green display elements or for color displays in volume-colored glass ceramics, especially glass ceramics colored by vanadium oxide. Therefore, according to yet another embodiment of the invention, the ratio of spectral transmittances of the first region to the second region is greater at a wavelength in a range from 400 to 500 nanometers than at a wavelength in a range from 600 to 800 nanometers.

Below, the colors are listed as measured in the treated and non-treated regions 15, 16 in transillumination of the glass ceramic plate of 4 mm thickness, for different color models (xyY, Lab, Luv) and various standard light sources:

| | region 16 | region 15 |
|---|---|---|
| Standard light type A | | |
| x | 0.6307 | 0.5782 |
| y | 0.3480 | 0.3805 |
| Y | 1.7 | 7.6 |
| Standard light type D65 | | |
| x | 0.5550 | 0.4773 |
| y | 0.3540 | 0.3752 |
| Y | 1.2 | 6.2 |
| Ra | −25.6 | 22.0 |
| Standard light type C | | |
| x | 0.5545 | 0.4763 |
| y | 0.3495 | 0.3685 |
| Y | 1.2 | 6.3 |
| Yellowness I. | 174.0 | 120.8 |
| Standard light type A | | |
| L* | 13.6 | 33.2 |
| a* | 23.2 | 24.2 |
| b* | 19.1 | 27.7 |
| C* | 30.0 | 36.8 |
| Standard light type D65 | | |
| L* | 10.6 | 30.0 |
| a* | 20.8 | 20.2 |
| b* | 13.8 | 22.9 |
| C* | 25.0 | 30.5 |
| Standard light type C | | |
| L* | 10.8 | 30.2 |
| a* | 20.1 | 19.2 |
| b* | 14.1 | 23.2 |
| C* | 24.5 | 30.1 |
| Standard light type A | | |
| L* | 13.6 | 33.2 |
| u* | 30.3 | 45.3 |
| v* | 0.9 | 4.3 |
| Standard light type D65 | | |
| L* | 10.6 | 30.0 |
| u* | 22.6 | 36.6 |
| v* | 7.0 | 18.5 |
| Standard light type C | | |
| L* | 10.8 | 30.2 |
| u* | 22.9 | 36.7 |
| v* | 7.8 | 20.3 |

In the Lab, xyY, and Luv color models, parameters L and Y, respectively, denote the brightness. When using standard light type C or standard light type D65, the parameter Y in the xyY color model corresponds to transmission $\tau_{vis}$ in the visible spectral range, and from a comparison of the Y values the increase in transmission can be determined. From the values given above it can be seen that transmission in the visible spectral range is increased by at least a factor of 2.5. Generally, it should be noted here that the transmission additionally depends on the refractive index and on the thickness of the transilluminated glass or glass ceramic element. However, it can be generally stated that according to one embodiment of the invention the transmittance in the visible spectral range between 380 and 780 nanometers is increased by at least a factor of 2.5, based on a thickness of 4 millimeters.

The coloring by vanadium oxide, $V_2O_5$, as was the case in the exemplary embodiments of FIGS. 3 and 4 discussed above, has also been known from DE 10 2008 050 263 B4, according to which the coloring mechanism is a complex process. According to this document, a prerequisite for converting the vanadium oxide into the coloring state is a redox reaction. In the crystallizable initial glass, the $V_2O_5$ still colors relatively weakly and produces a slightly greenish tint. During ceramization the redox reaction occurs, the vanadium is reduced and the redox partner is oxidized.

The refining agent functions as the primary redox partner, which was shown by Mossbauer investigations of Sb and Sn refined compositions. During ceramization, a part of the $Sb^{3+}$ or $Sn^{2+}$ in the initial glass is converted to the higher oxidation state $Sb^{5+}$ and $Sn^{4+}$, respectively. It was assumed that the vanadium is incorporated into the seed crystal in the reduced oxidation state as $V^{4+}$ or $V^{3+}$ and intensively colors therein due to electron charge transfer reactions. Also, as another redox partner, $TiO_2$ may reinforce the coloring by vanadium oxide. Besides the type and quantity of the redox partners in the initial glass, the redox state that is adjusted in the glass for the melt also has an influence, according to DE 10 2008 050 263 B4. A low oxygen partial pressure, i.e. a melt adjusted as reducing, for example due to high melting temperatures, reinforces the coloring effect of the vanadium oxide.

But it is also possible that the reduced $V^{4+}$ or $V^{3+}$ is not or not exclusively incorporated into the seed crystals, but possibly also into another structural environment, such as the high-quartz mixed crystal, or into clusters.

With the invention, this coloration is locally modified by irradiation of high-energy radiation and heating of the glass ceramic.

This may be associated with an impact on the coloring charge transfer process. Since the hypothetical electron transfer between donor and acceptor centers during charge transfer is significant for absorption, it can be assumed that the applied high-energy radiation and the heating cause a modification of the structure of these centers. This structural modification reduces the frequency/likelihood of electron transfers and thus absorption.

Because of the sensitivity with which the coloring by vanadium reacts to partial pressure of oxygen and to redox processes during ceramizing, competing valency changes might be relevant for this. That is to say, the radiation in combination with the heating may possibly remove electrons from the donor or acceptor centers thereby passivating them for the charge transfer process.

This hypothesis is supported by the observation that the reduced coloration can be reversed by thermal treatment. The thermodynamically more stable structural state of the centers can be restored. This re-increases the frequency of coloring charge transfers.

Figure 5:
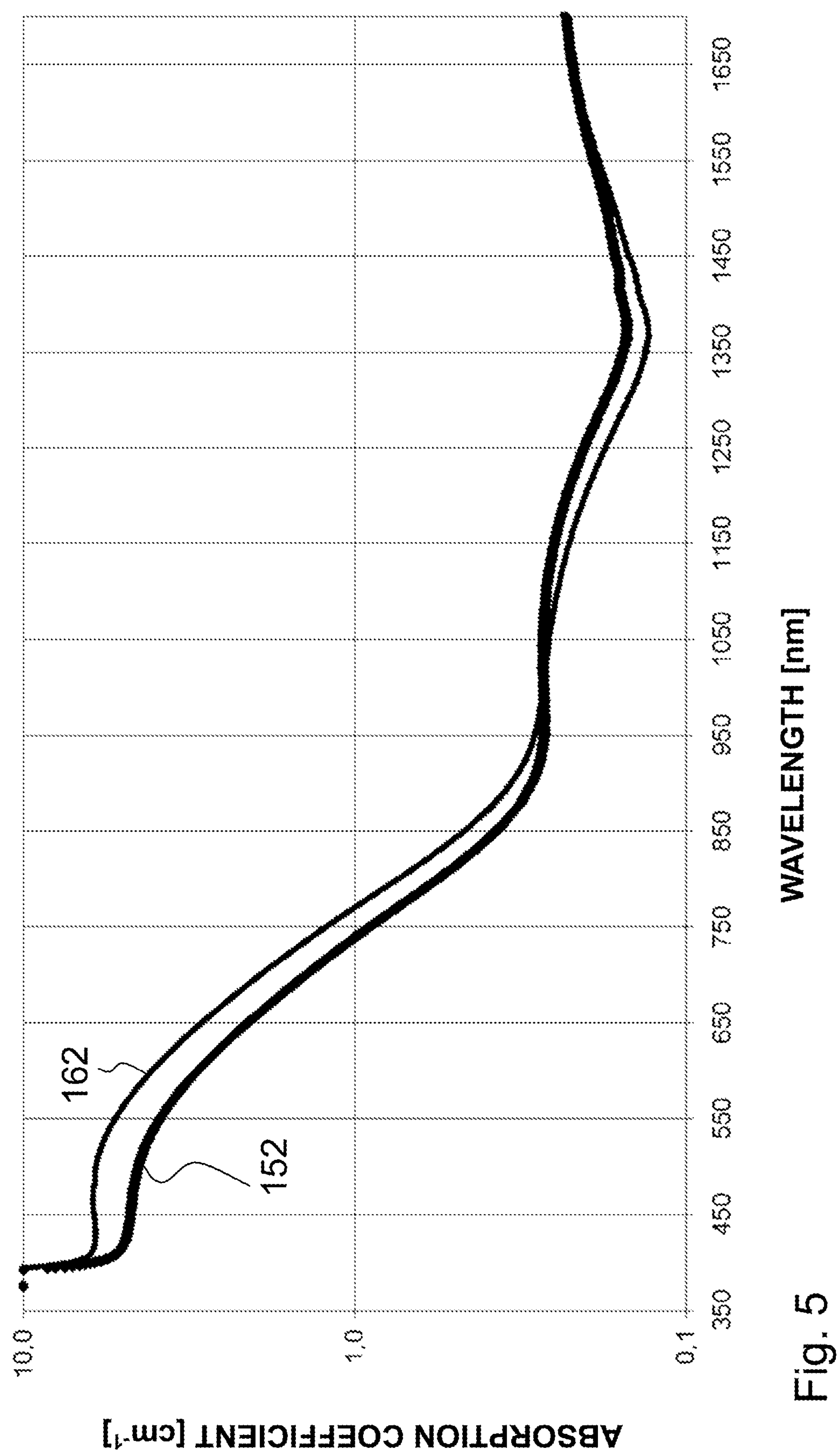
FIG. 5 is a graph of the absorption coefficient of a treated region and a non-treated region of a glass ceramic cooking plate as a function of wavelength.

FIG. 5 shows a diagram of absorption coefficient curves as a function of wavelength as measured in a region brightened according to the invention and in a non-treated region. As with the curve of light transmittance shown in FIG. 4, the glass ceramic in which the profile was measured has been colored by vanadium oxide. The higher light transmission of a brightened region 15 is now apparent here from the fact that in the visible spectral range the spectral absorption coefficient 152 of a brightened region is lower than the absorption coefficient 162 of an adjacent, non-brightened region 16. In particular, as in the example shown in FIG. 4, the absorption coefficient of the glass ceramic of a brightened region 15 may be lower than the absorption coefficient of the material of an adjacent, non-brightened region 16 over the entire visible spectral range. In the visible spectral range, the absorption coefficient decreases with increasing wavelength. Accordingly, spectral light transmittance increases, similarly to the example shown in FIG. 3.

Also, it is obvious that the curves of spectral absorption coefficients 152, 162 cross each other in the infrared spectral range at a wavelength of about 1000 nanometers. Above this wavelength, the absorption coefficient of the first region 15 is higher than the absorption coefficient of an adjacent, second region 16.

In the example shown, the absorption coefficient of first region 15 is higher than that of second region 16 in the infrared range up to a wavelength of 1650 nanometers.

Generally, without being limited to the exemplary embodiment, according to one embodiment of the invention it is therefore contemplated, that in at least a spectral range having a wavelength of more than 900 nanometers the absorption coefficient of the first region 15 is greater than the absorption coefficient of a second, adjacent region 16, so that in the spectral range having a wavelength of more than 900 nanometers integral light transmission of first region 15 is lower than integral light transmission of the second, adjacent region 16 in this spectral range. Preferably, this spectral range extends at least between 1100 nanometers and 1400 nanometers, which also applies to the illustrated exemplary embodiment of FIG. 5.

The spectral range mentioned above in particular applies to glass ceramics colored by vanadium oxide. This effect of a higher absorption coefficient of first region 15 in the infrared spectral range may also occur when coloration is effected by rare earth elements, in particular by cerium, preferably in combination with chromium and/or nickel and/or cobalt; by manganese, preferably in combination with tin and/or titanium; or by iron, preferably in combination with tin and/or titanium. However, the wavelength range may possibly differ from that of the example shown in FIG. 5.

The higher absorption coefficient in the infrared spectral range of the first region 15 may be advantageous for example for a display device 23 arranged below region 15 of a glass ceramic plate. This reduces the risk that due to heat sources on the cooktop the display device is excessively heated through the glass ceramic and becomes damaged.

Figure 6:
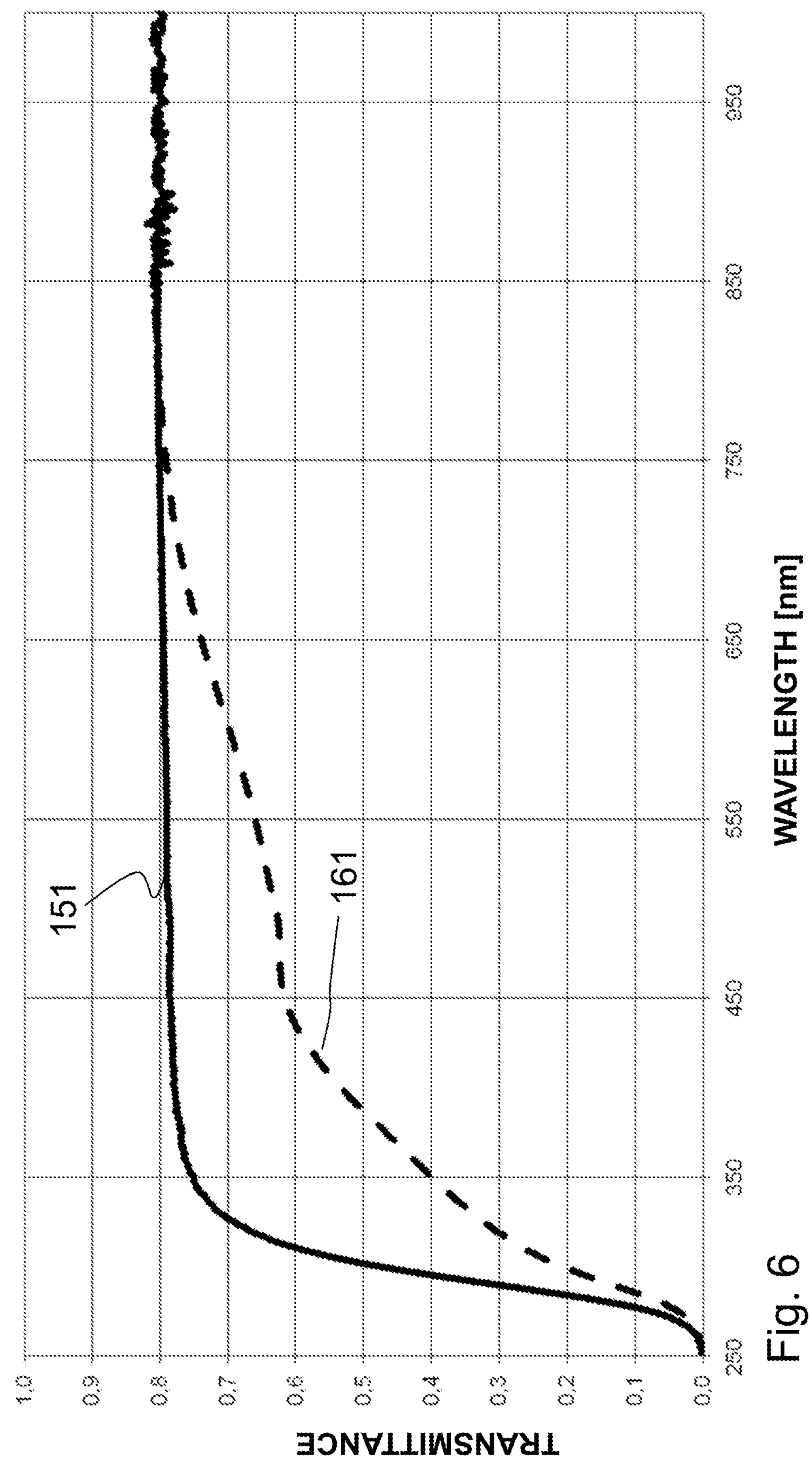
FIG. 6 is a graph of spectral transmittance of a treated and a non-treated region of a solarized borosilicate glass.

FIG. 6 shows the spectral transmittance of a treated and a non-treated region of a solarized borosilicate glass. The borosilicate glass is marketed under the trade name Fiolax. The solarization was produced by irradiation with gamma rays. Then, as explained with reference to FIG. 2, the glass was heated by laser radiation of a wavelength of 1 μm to a temperature between $T_g$ and the softening point. As in FIG. 4, curve 151 again shows the spectral transmittance of the so treated region 15 of the glass, curve 161 the spectral transmittance of an adjacent region 16 that has not been treated with the laser. The color change due to an increase in transmission caused by the laser treatment according to the invention is obvious. The treated region 15 exhibits a nearly constant transmission in the visible spectral range, which shows that the solarization has been substantially completely offset.

Here, again, the increase in transmission is more pronounced in the blue and green spectral ranges than in the red spectral range. In this example, in the blue and also in the ultraviolet spectral range until a wavelength of about 300 nanometers not only the relative, but even the absolute increase in transmission is greater than in the red spectral range.

Below, the measured color values for transillumination with standard light source are given for the treated region 15 and for an adjacent region 16:

| | region 16 | region 15 |
|---|---|---|
| Standard light type A | | |
| x | 0.4602 | 0.4484 |
| y | 0.4079 | 0.4077 |
| Y | 67.8 | 79.1 |

-continued

| | region 16 | region 15 |
|---|---|---|
| Standard light type D65 | | |
| x | 0.3256 | 0.3136 |
| y | 0.3373 | 0.3299 |
| Y | 66.8 | 79.0 |
| Ra | 94.0 | 99.4 |
| Standard light type C | | |
| x | 0.3231 | 0.3110 |
| y | 0.3248 | 0.3170 |
| Y | 66.8 | 79.0 |
| Yellowness | 12.4 | 1.2 |
| Standard light type A | | |
| L* | 85.9 | 91.3 |
| a* | 3.9 | 0.2 |
| b* | 5.5 | 0.5 |
| C* | 6.8 | 0.5 |
| Standard light type D65 | | |
| L* | 85.4 | 91.3 |
| a* | 2.3 | 0.0 |
| b* | 4.9 | 0.5 |
| C* | 5.4 | 0.5 |
| Standard light type C | | |
| L* | 85.4 | 91.3 |
| a* | 2.0 | 0.0 |
| b* | 5.0 | 0.5 |
| C* | 5.4 | 0.5 |
| Standard light type A | | |
| L* | 85.9 | 91.3 |
| u* | 8.8 | 0.5 |
| v* | 2.3 | 0.3 |
| Standard light type D65 | | |
| L* | 85.4 | 91.3 |
| u* | 6.5 | 0.4 |
| v* | 7.0 | 0.7 |
| Standard light type C | | |
| L* | 85.4 | 91.3 |
| u* | 6.4 | 0.4 |
| v* | 7.4 | 0.7 |

Based on the Y values of the xyY color measurements, the resulting increase in transmission $\tau_{vis}$ in the visible spectral range is at least 10%.

According to yet another embodiment of the invention, a diffusion-colored glass or glass ceramic element is treated according to the invention and the coloration imparted by the diffusion ink is locally modified in this manner. Diffusion inks diffuse into the glass or glass ceramic and thereby also cause volume coloring. In this case, however, the material will usually not be colored throughout the volume, rather a volume-colored layer is resulting that extends from the surface to a certain depth into the material.

In the example below, a borosilicate glass (again a Fiolax glass) was colored using a brown diffusion ink and was then locally treated with the laser as described with reference to FIG. 2. In this manner, a product is obtained from or with a diffusion-colored glass or glass ceramic element in which the first region 15 exhibits higher light transmission in the visible spectral range than an adjacent, non-treated region 16.

Figure 7:
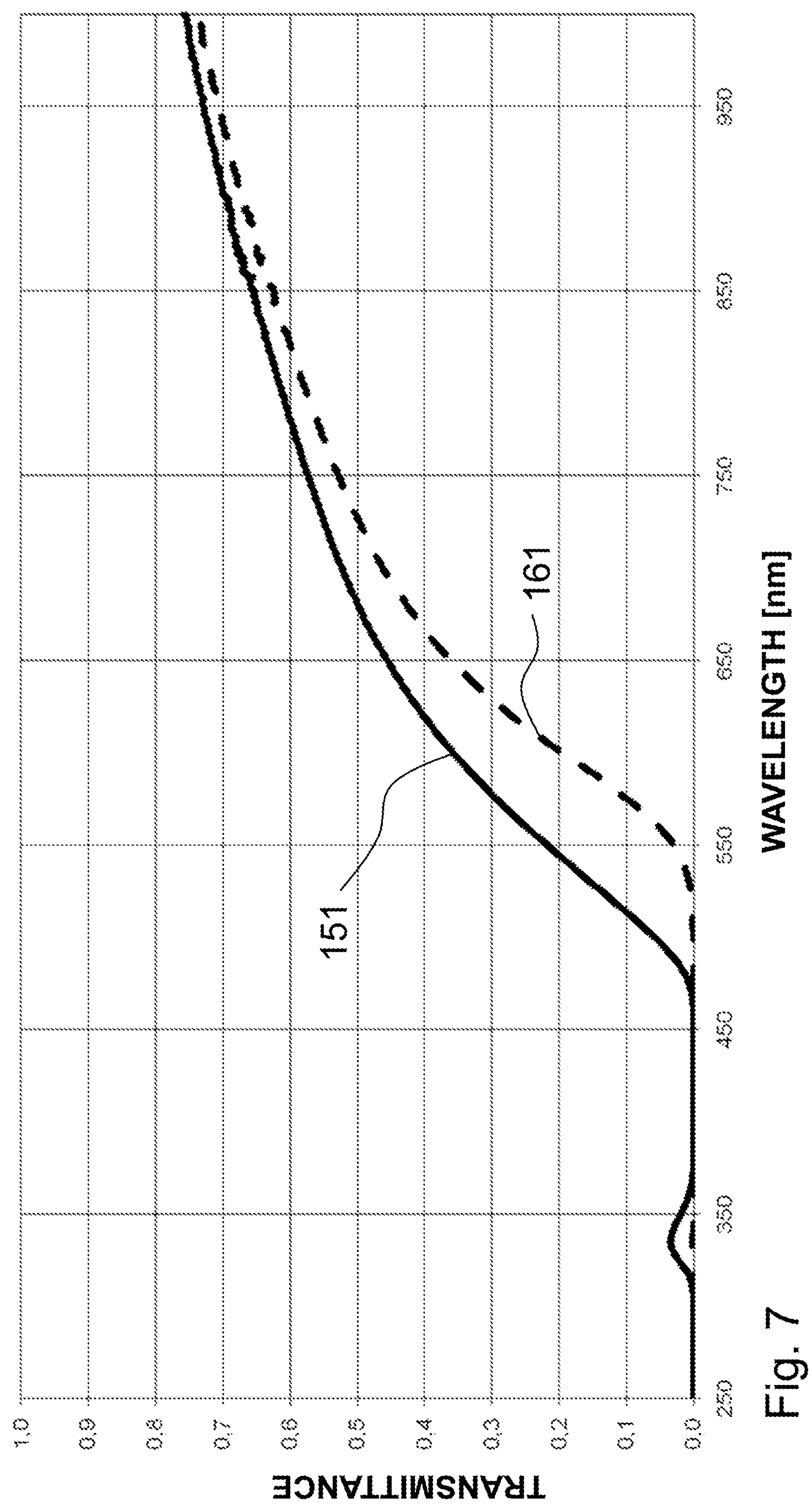
FIG. 7 is a graph of spectral transmittance of a treated and a non-treated region of a diffusion-colored borosilicate glass.

FIG. 7 shows spectral transmittance of the diffusion-colored borosilicate glass for this embodiment of the invention, with curve 151 again representing the transmission of treated region 15 and curve 161 representing the transmission of non-treated region 16. Here, again, a significant increase in transmission is resulting in the treated region 15 and thus an alteration in color. As with the examples of FIG. 4 and FIG. 6, the relative increase in transmission in the blue and green spectral ranges is again greater than in the red spectral range. At a wavelength of 550 nanometers, the diffusion-colored glass exhibits a transmittance of less than 0.05. By the laser treatment, the transmittance at this wavelength is increased to more than 0.2, that is by more than a factor of 4.

Below, the measured color values for transillumination with standard light source are given for the treated region 15 and for an adjacent region 16 of the diffusion-colored glass:

| | region 16 | region 15 |
|---|---|---|
| Standard light type A | | |
| x | 0.6420 | 0.5704 |
| y | 0.3572 | 0.4217 |
| Y | 11.9 | 27.5 |
| Standard light type D65 | | |
| x | 0.6186 | 0.5166 |
| y | 0.3798 | 0.4656 |
| Y | 8.4 | 23.3 |
| Ra | −24.4 | 17.8 |
| Standard light type C | | |
| x | 0.6192 | 0.5197 |
| y | 0.3792 | 0.4626 |
| Y | 8.5 | 23.5 |
| Yellowness | 208.6 | 139.7 |
| Standard light type A | | |
| L* | 41.1 | 59.5 |
| a* | 43.9 | 23.4 |
| b* | 69.7 | 81.5 |
| C* | 82.3 | 84.8 |
| Standard light type D65 | | |
| L* | 34.7 | 55.4 |
| a* | 43.0 | 16.3 |
| b* | 59.4 | 82.8 |
| C* | 73.3 | 84.4 |
| Standard light type C | | |
| L* | 35.1 | 55.6 |
| a* | 40.8 | 14.3 |
| b* | 60.0 | 84.0 |
| C* | 72.6 | 85.2 |
| Standard light type A | | |
| L* | 41.1 | 59.5 |
| u* | 91.7 | 57.0 |
| v* | 6.0 | 18.7 |
| Standard light type D65 | | |
| L* | 34.7 | 55.4 |
| u* | 87.5 | 54.6 |
| v* | 32.7 | 62.3 |
| Standard light type C | | |
| L* | 35.1 | 55.6 |
| u* | 87.4 | 54.8 |
| v* | 36.4 | 67.5 |

The increase in transmission in the visible spectral range as apparent from the Y values is by more than a factor of 2.

Figure 8:
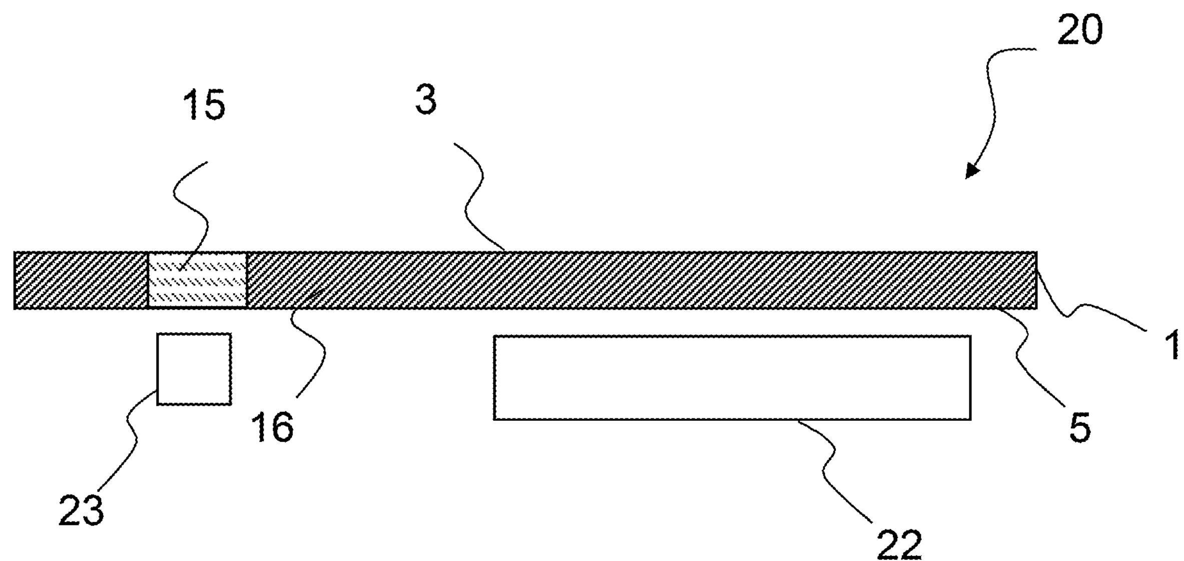
FIG. 8 shows a glass ceramic cooktop comprising a glass ceramic plate according to the invention.

FIG. 8 shows a glass ceramic cooktop 20 as one of the preferred applications of the invention. Glass ceramic cooktop 20 comprises a glass ceramic plate 1 that has a first face 3 which defines the upper surface in this example, and an opposite, second face which defines the lower surface. Underneath the lower surface or second face 5, a heating element 22 is arranged, for heating a cooking vessel placed upon the first face 3 above heating element 22. Glass ceramic plate 1 has a first region 15 which extends through the glass ceramic plate 1 from one surface to the opposite surface of the two faces 3, 5 and in which light transmission is increased relative to adjacent regions 16. Below first region 15, a preferably self-luminous display device 23 is disposed, and the light from the display device is visible through the first region 15. First region 15 was produced by a treatment according to the invention using a laser or another locally acting electromagnetic radiation source, by heating and subsequent cooling. In order to avoid that the parts arranged under glass ceramic plate 1, such as heating element 22, are visible when looking to upper surface 3, a volume-colored glass ceramic may be used, for instance with a vanadium oxide content of more than 0.02 percent by weight. Due to the local attenuation of absorption or the local brightening of the glass ceramic in region 15, the light from the display device 23 will nevertheless be transmitted through the glass ceramic plate 1 and will be clearly visible for an operator.

Since very clear brightening effects can be achieved with the invention, the method is especially useful for dark glass ceramic plates to make them more transparent for display purposes. Therefore, without being limited to the exemplary embodiment, according to one embodiment of the invention a glass ceramic plate is used, in which integral light transmission in the visible spectral range of the second region 16 adjacent to first region 15 is not more than 5%, preferably not more than 2.5%. In other words, the glass ceramic plate which is the starting material for the cooking plate exhibits a correspondingly low transmission of not more than 5%, preferably not more than 2.5%.

Figure 9:
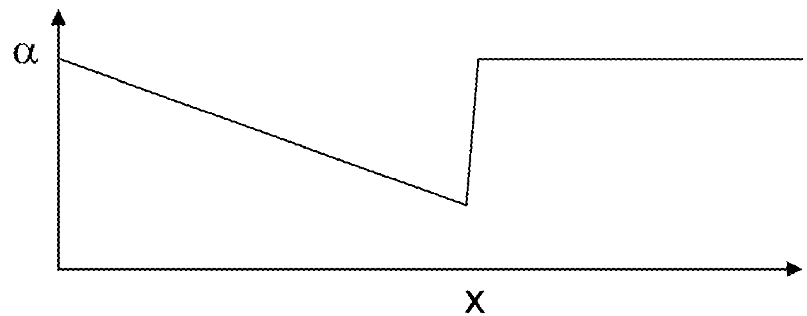
FIG. 9 shows a glass or glass ceramic article having a flat facet.
Figure 9:
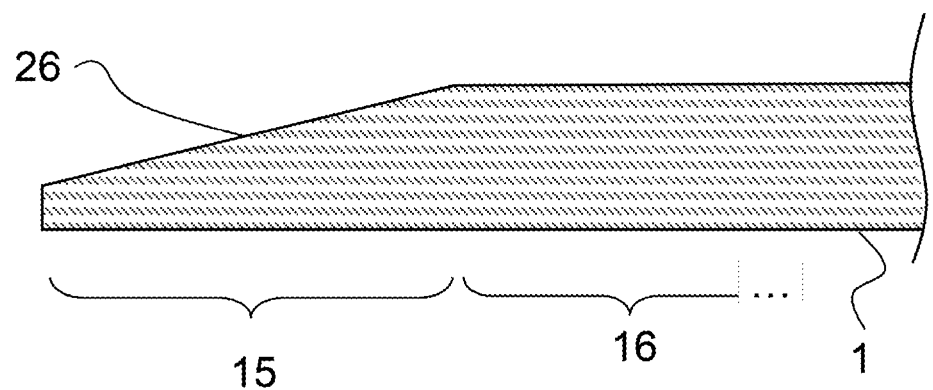

Display devices may also be arranged under a flat facet. An example of a glass ceramic plate 1 having such a flat facet 26 is shown FIG. 9. If now in an example as shown in FIG. 8 a display device is intended to be arranged below flat facet 26, a problem arising with volume-colored glass or glass ceramics is that due to the varying thickness of the material in the region of flat facet 26 light transmission also varies along the surface. Here, the invention now generally provides the possibility to compensate for variations in transmission caused by varying thicknesses of the glass or glass ceramic material. For this purpose, the treatment time and/or the power of incident electromagnetic radiation may be varied as a function of thickness. Above glass ceramic plate 1, FIG. 9 schematically shows a profile of absorption coefficient $\alpha$ as a function of displacement coordinate x along the surface of glass ceramic plate 1. Here, flat facet 26 extends from the edge of the glass ceramic plate where, accordingly, the glass ceramic plate has the smallest thickness and therefore exhibits highest transmission without the treatment according to the invention. In order to keep transmission constant along flat facet 26, the absorption coefficient $\alpha$ is gradually lowered starting from the edge until the inside border of flat facet 26. Thus, the area provided with flat facet 26 also forms the first region 15 in which the coloration differs from a second, adjacent region 16 next to flat facet 26 (i.e. the region with plane-parallel faces).

In this way, light transmission keeps its constant value it has at the edge of the plate all along flat facet 26. At the inside border of flat facet 26, the absorption coefficient may then rapidly increase to the value of the non-treated glass ceramic. Therefore, there is a step in the profile of the absorption coefficient at this point. In this manner, flat facet 26 will appear as a uniformly brightened area. Therefore, without being limited to the specific application shown in FIG. 9, a glass or glass ceramic element may be provided, which has a thickness that varies along at least a portion of the surface, in which the absorption coefficient is locally varied by the treatment of the invention, i.e. in first region 15, as a function of the thickness, in particular in such a manner that light transmission which locally varies due to the varying thickness is evened out, at least partially. Specifically to this end, an absorption coefficient is adjusted that decreases with increasing thickness.

In the exemplary embodiment of FIG. 8, the brightened first region 15 is a localized window which typically only extends over a small portion of the surface area of face 3. A flat facet 26 as shown in the example of FIG. 9 typically does not extend over a large portion of face 3 either. According to one embodiment of the invention, therefore, the total surface area of the one or more first regions 15 at a face of the glass or glass ceramic article occupies not more than one third of the surface area of this face 3.

It will be apparent to those skilled in the art that the invention is not limited to the described exemplary embodiments but can be varied in many ways without departing from the scope of the subject matter of the claims. For example, besides a laser other radiation sources are likewise conceivable. For instance a high-performance short-arc lamp may be used. To achieve a localized exposure to the light, the glass or glass ceramic element may be masked appropriately. Another option is to use a microwave source with appropriate masking.

LIST OF REFERENCE NUMERALS

1 Glass ceramic plate
3 First face of 1
5 Second face of 1
7 Silicon oxide ceramic support
9 Laser
10 Glass tube
11 Transfer fiber
13 Laser scanner
14 Line generating optical system
15 Localized region with modified transmission
16 Region with non-modified transmission
18 Cooling fluid
20 Glass ceramic cooktop
22 Heating element
23 Display device
26 Flat facet
70 Metal plate
90 Laser beam
100 Outer circumferential surface of 10
101 Inner surface of 10
150 X-ray diffraction spectrum of 15
160 X-ray diffraction spectrum of 16
151 Spectral transmittance of 15
161 Spectral transmittance of 16
152 Spectral absorption coefficient of 15
162 Spectral absorption coefficient of 16

What is claimed is:

1. A product comprising:

a volume-colored monolithic glass or glass ceramic element that has a first region and a second, adjacent region, the first region having been locally heated as compared to the second region by a laser beam so that the first region has a coloration that is different from that of the second, adjacent region and so that an absorption coefficient of the first region and thus light transmission through the first region is different from an absorption coefficient and thus light transmission of the second, adjacent region, wherein the first region has a spectral transmission that is greater than in the adjacent, second region within an entire spectral range between 420 nanometers and 780 nanometers, and wherein the first region has light scattering that differs from light scattering in the second region by not more than 20 percentage points.

2. The product as claimed in claim 1, wherein the glass or glass ceramic element comprises glass or glass ceramic comprising ions of a metal selected from the group consisting of vanadium, vanadium in combination with tin, vanadium in combination with titanium; rare earth elements, cerium, cerium in combination with chromium, cerium in combination with nickel, cerium in combination with cobalt, manganese, manganese in combination with tin, manganese in combination with titanium, iron, iron in combination with tin, iron in combination with titanium, and any combinations thereof.

3. The product as claimed in claim 2, wherein the glass or glass ceramic is volume-colored by vanadium oxide, wherein the first region has an integral light transmission in the visible spectral range that is increased relative to the second, adjacent region.

4. The product as claimed in claim 3, wherein the glass or glass ceramic comprises at least 0.005 percent by weight of vanadium oxide.

5. The product as claimed in claim 1, wherein the glass or glass ceramic element is a solarized glass element, wherein the solarized glass element comprises solarization sufficient to cause a volume-coloration due to light absorption in the visible spectral range, and wherein the first region has an integral light transmission that is increased compared to the second region.

6. The product as claimed in claim 1, wherein the glass or glass ceramic element is a diffusion-colored glass or glass ceramic element in which the first region exhibits increased light transmission in the visible spectral range compared to the adjacent region.

7. The product as claimed in claim 1, wherein the first region extends from a first surface to a second, opposite surface of the glass or glass ceramic element.

8. The product as claimed in claim 1, wherein the first region is a window that is surrounded along at least three edges thereof or along at least 50% of its periphery by adjacent non-brightened second regions.

9. The product as claimed in claim 1, wherein the glass or glass ceramic element has a face with a total surface area, wherein the first region occupies not more than one third of the total surface area.

10. The product as claimed in claim 1, wherein the glass or glass ceramic element comprises an aluminosilicate glass ceramic element in which the first region has a greater content of keatite mixed crystal.

11. The product as claimed in claim 1, wherein remission for visible light in the first region differs from remission of the second region by not more than 20 percentage points.

12. The product as claimed in claim 11, wherein in the first region transmission in the visible spectral range is greater by at least a factor of 2 compared to the second, adjacent region.

13. The product as claimed in claim 1, wherein the first region has a stress at the surface that is lower than a stress in a center of the volume of the first region.

14. The product as claimed in claim 1, wherein the glass or glass ceramic element has a thickness that varies along at least a portion of a surface, the portion having an absorption coefficient that locally varies as a function of the thickness.

15. The product as claimed in claim 14, wherein the first region is a window which is surrounded along at least three edges thereof or along at least 50% of its periphery by adjacent non-brightened second regions.

16. The product as claimed in claim 1, wherein the glass or glass ceramic element is a glass ceramic cooktop having a self-luminous display device disposed below the first region and emitting light that is visible through the first region.

17. The product as claimed in claim 1, wherein the first and second regions lack any coating thereon or joining therebetween.

18. A product, comprising:

a volume-colored monolithic glass or glass ceramic element consisting of a first region and a second region adjacent to one another within the monolithic glass or glass ceramic element, the first and second regions having different colorations so that an absorption coefficient of the first region and a light transmission through the first region are different from an absorption coefficient of the second region and a light transmission through the second region, the first region having a spectral transmission that is greater than a spectral transmission in the second region within an entire spectral range between 420 nanometers and 780 nanometers, and the first region having a light scattering that differs from a light scattering in the second region by not more than 20 percentage points.

* * * * *